(12) United States Patent
Oh et al.

(10) Patent No.: US 8,304,039 B2
(45) Date of Patent: Nov. 6, 2012

(54) LIQUID CRYSTAL DISPLAY DEVICE AND MANUFACTURING METHOD THEREOF

(75) Inventors: Ho-Kil Oh, Seoul (KR); Su-Jeong Kim, Seoul (KR); Su-Han Woo, Asan-si (KR); Jae-Jin Lyu, Yongin-si (KR); Min-Hee Kim, Ansan-si (KR)

(73) Assignee: Samsung Display Co., Ltd., Yongin (KR)

( * ) Notice: Subject to any disclaimer, the term of this patent is extended or adjusted under 35 U.S.C. 154(b) by 207 days.

(21) Appl. No.: 12/902,770

(22) Filed: Oct. 12, 2010

(65) Prior Publication Data
US 2011/0261278 A1  Oct. 27, 2011

(30) Foreign Application Priority Data
Apr. 21, 2010 (KR) .................. 10-2010-0036892

(51) Int. Cl.
*G02F 1/1337* (2006.01)
*G02F 1/1343* (2006.01)
*C09K 19/38* (2006.01)
*C09K 19/56* (2006.01)
*C09K 19/54* (2006.01)

(52) U.S. Cl. ...... 428/1.2; 428/1.23; 428/1.25; 428/1.26; 349/48; 349/141; 349/143; 349/144; 252/299.4; 252/299.5

(58) Field of Classification Search .................. 428/1.1, 428/1.2, 1.23, 1.25, 1.26; 349/48, 123, 141, 349/143, 144; 252/299.4, 299.5
See application file for complete search history.

(56) References Cited

U.S. PATENT DOCUMENTS

| 6,368,681 | B1 | 4/2002 | Ogawa |
| 8,153,208 | B2* | 4/2012 | Lee et al. ............... 428/1.1 |
| 2002/0187283 | A1 | 12/2002 | Gu et al. |
| 2006/0146267 | A1 | 7/2006 | Choi et al. |
| 2010/0283951 | A1* | 11/2010 | Lee et al. ............... 349/124 |
| 2011/0051059 | A1* | 3/2011 | Kang et al. ............. 349/110 |
| 2011/0051065 | A1* | 3/2011 | Seong et al. ........... 349/123 |

FOREIGN PATENT DOCUMENTS

| JP | 10-268318 | 10/1998 |
| JP | 10-325955 | 12/1998 |
| JP | 2009-162842 | 7/2009 |
| KR | 1020060121314 | 11/2006 |
| KR | 1020070061752 | 6/2007 |
| KR | 10-0831961 | 5/2008 |
| KR | 1020080044416 | 5/2008 |
| KR | 1020080087336 | 10/2008 |
| KR | 1020080091909 | 10/2008 |
| KR | 1020080095663 | 10/2008 |
| KR | 1020090019362 | 2/2009 |

* cited by examiner

*Primary Examiner* — Shean C Wu
(74) *Attorney, Agent, or Firm* — H.C. Park & Associates, PLC (57) ABSTRACT

A liquid crystal display is provided that includes a first substrate; a second substrate facing the first substrate; a field generating electrode disposed on at least one of the first substrate and the second substrate; an alignment layer disposed on the field generating electrode; and a liquid crystal layer interposed between the first substrate and the second substrate and including a liquid crystal and an alignment polymer. The alignment layer initially contains an alignment material including an initiator, and the alignment polymer initially contains an alignment aid.

16 Claims, 9 Drawing Sheets

LIQUID CRYSTAL DISPLAY DEVICE AND MANUFACTURING METHOD THEREOF

CROSS REFERENCE TO RELATED APPLICATION

This application claims priority from and the benefit of Korean Patent Application No. 10-2010-0036892, filed on Apr. 21, 2010, which is hereby incorporated by reference for all purposes as if fully set forth herein.

BACKGROUND OF THE INVENTION

1. Field of the Invention

Exemplary embodiments of the present invention relate to a liquid crystal display and a manufacturing method thereof.

2. Discussion of the Background

Liquid crystal displays are widely used as a type of flat panel display. A liquid crystal display generally has two display panels on which field generating electrodes such as pixel electrodes and a common electrode are formed with a liquid crystal layer interposed between the panels.

In the liquid crystal display (LCD), voltages are applied to the field generating electrodes to generate an electric field through the liquid crystal layer, and the alignment of liquid crystal molecules of the liquid crystal layer may be determined by the electric field. Accordingly, the polarization of incident light may be controlled by passage through the liquid crystal layer, thereby displaying an image.

Among these LCDs, a vertical alignment mode LCD, which aligns major axes of liquid crystal molecules perpendicular to the display panel when an electric field is not applied, has been developed.

Also, a method for providing a pretilt to the liquid crystal molecules in the absence of an electric field has been developed to improve the response speed of the liquid crystal layer while realizing a wide viewing angle in the vertical alignment (VA) mode LCD.

The information disclosed in this section is for enhancement of understanding of the background of the invention and may contain information that is not part of the prior art.

SUMMARY OF THE INVENTION

Exemplary embodiments of the present invention provide a liquid crystal display and a manufacturing method for the liquid crystal display that may increase reliability of display images by decreasing the effects of afterimages.

Exemplary embodiments of the present invention also provide a liquid crystal display having an alignment layer that includes an initiator with an improved hardening speed for a reactive mesogen.

Exemplary embodiments of the present invention further provide a liquid crystal display manufactured by a reduced process time and having decreased afterimage's, thereby improving the reliability of the liquid crystal display.

Additional features of the invention will be set forth in the description which follows and, in part, will be apparent from the description or may be learned by practice of the invention.

An exemplary embodiment of the present invention discloses a liquid crystal display that includes a first substrate; a second substrate facing the first substrate; a field generating electrode disposed on at least one of the first substrate and the second substrate; an alignment layer disposed on the field generating electrode; and a liquid crystal layer interposed between the first substrate and the second substrate and comprising a liquid crystal and an alignment polymer. The alignment layer initially comprises an alignment material comprising an initiator, and the alignment polymer initially comprises an alignment aid.

An exemplary embodiment of the present invention also discloses a method for manufacturing a liquid crystal display that includes forming a field generating electrode on at least one of a first substrate and a second substrate facing the first substrate; forming an alignment layer comprising an initiator on the field generating electrode; disposing a liquid crystal layer comprising a liquid crystal and an alignment aid between the first substrate and the second substrate; applying a first voltage to the first substrate and a second voltage to the second substrate, the first voltage and the second voltage being different from each other; and irradiating light to the alignment layer and the liquid crystal layer to form an alignment polymer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

The invention is described more fully hereinafter with reference to the accompanying drawings in which embodiments of the invention are shown. This invention may, however, be embodied in many different forms and should not be construed as limited to the embodiments set forth herein. Rather, these embodiments are provided so that this disclosure is thorough and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on," "connected to," or "coupled to" another element or layer, it can be directly on, directly connected to, directly coupled to the other element or layer, or intervening elements or layers may be present. In contrast, when an element is referred to as being "directly on," "directly connected to," or "directly coupled to" another element or layer, there are no intervening elements or layers present.

Figure 1:
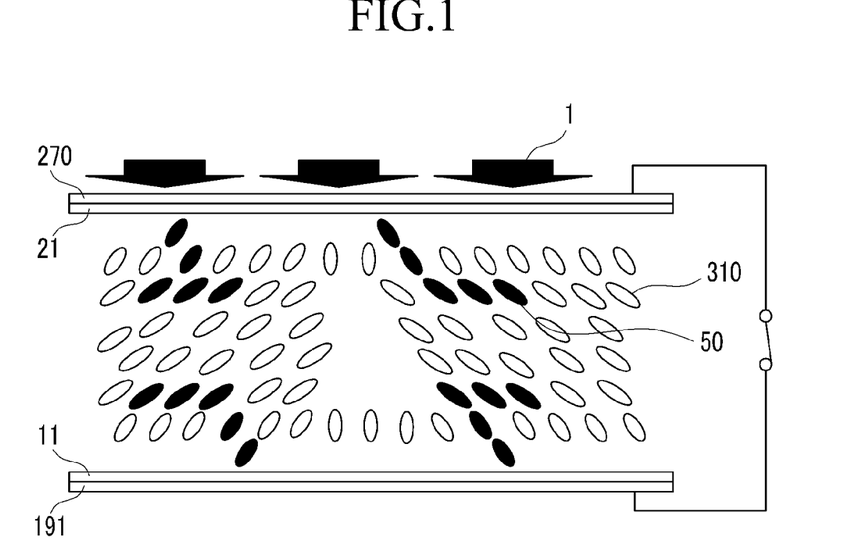
FIG. 1 and FIG. 2 show a method of forming a pretilt of a liquid crystal by an alignment aid according to an exemplary embodiment of the present invention.
Figure 2:
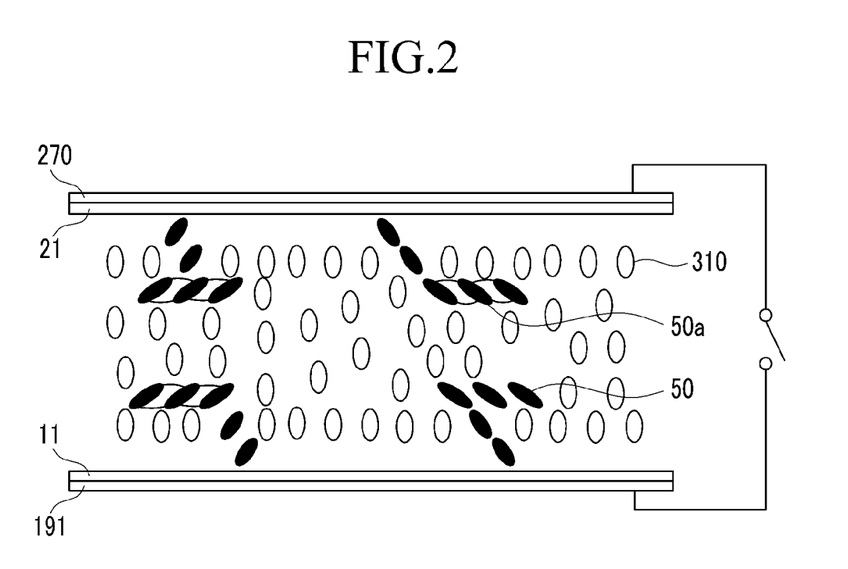

FIG. 1 and FIG. 2 show a method of forming a pretilt in a liquid crystal by an alignment aid according to an exemplary embodiment of the present invention.

Referring to FIG. 1, a liquid crystal layer including an alignment aid 50 and liquid crystal molecules 310 is positioned between a pixel electrode 191 and a common electrode 270.

Alignment layers 11 and 21, which may be formed by coating an alignment material, are positioned on the pixel electrode 191 and the common electrode 270, respectively. The alignment layers 11 and 21 according to an exemplary embodiment of the present invention include an initiator. The alignment layers 11 and 21 may be formed from a material such as a polyamic acid, a polysiloxane, or a polyimide.

The liquid crystal molecules 310 are arranged in a direction perpendicular to the pixel electrode 191 and the common electrode 270 when a voltage is not applied. Here, the pixel electrode 191 and the common electrode 270 are applied with a voltage.

The liquid crystal molecules 310 and the alignment aid 50 are inclined in a direction parallel to a length direction of minute branches, which are described below, of the pixel electrode 191 by the application of the voltage.

Light 1 is irradiated when voltages are applied to the pixel electrode 191 and common electrode 270 to produce an electric field between them. The light 1 may have a wavelength, e.g., ultraviolet wavelengths, that can polymerize the alignment aid 50.

In the process of polymerizing the alignment aid 50 through the irradiation of the light 1, the initiator included in the alignment layers 11 and 21 accelerates the polymerization of the alignment aid 50.

The initiator according to an exemplary embodiment of the present invention is mixed in the alignment layers 11 and 21 and is formed on the pixel electrode 191 and the common electrode 270, thereby assisting the polymerization of the alignment aid 50 on the surface of the alignment layers 11 and 21.

The polymerization of the alignment aid 50 is mainly generated on the surface of the alignment layers 11 and 21 so that the initiator may not remain in the liquid crystal layer after the polymerization of the alignment aid 50 if the initiator is included in the alignment layers 11 and 21. This methodology may improve display reliability by decreasing the effects of afterimages.

Also, the initiator included in the alignment layers 11 and 21 may be used for photopolymerization acceleration of the alignment aid 50, and the initiator content may be reduced with small amounts of the initiator detected inside the alignment layers 11 and 21 after light irradiation.

Now, the initiator used in a liquid crystal display and a manufacturing method of the liquid crystal display according to an exemplary embodiment of the present invention is described. Below, the alignment aid 50 may be represented as a reactive mesogen (RM).

Figure 3:
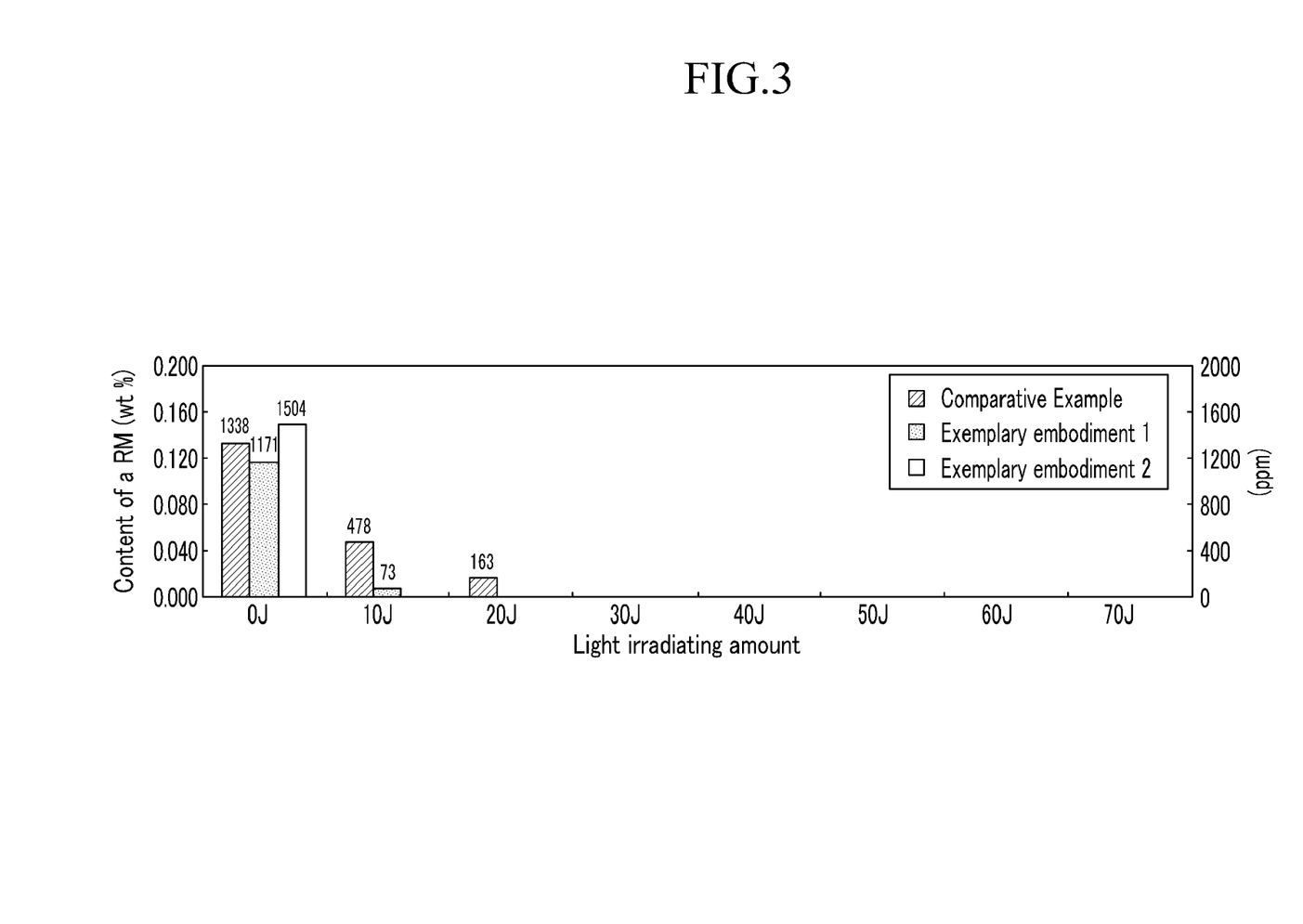
FIG. 3 is a graph showing the relative amount that a reactive mesogen is decreased corresponding to the amount of light irradiated to a liquid crystal display according to an exemplary embodiment of the present invention.

FIG. 3 is a graph showing the relative amount that a reactive mesogen is decreased corresponding to the amount of light irradiated to a liquid crystal display according to an exemplary embodiment of the present invention.

Table 1, shown below, lists the amount of the decrease of the reactive mesogen.

The Comparative Example corresponds to exclusion of the initiator, and Exemplary Embodiment 1 includes an initiator including a compound represented by Formula 1. Exemplary Embodiment 2 includes an initiator including a compound represented by Formula 2.

Formula 1

Formula 2

Referring to FIG. 3 and Table 1, when the light irradiation is greater than 30 J in the Comparative Example, the reactive mesogen is almost completely consumed. When the light irradiation is greater than 20 J in Exemplary Embodiment 1, the reactive mesogen is almost completely consumed. When the light irradiation is greater than 10 J in Exemplary Embodiment 2, the reactive mesogen is almost completely consumed.

Accordingly, as in Exemplary Embodiment 1 and Exemplary Embodiment 2, the content of the remaining reactive mesogen may be largely reduced when the initiator is added to the alignment layer and the light energy is more than 10 J. The reactive mesogen content may be reduced to less than a detectable limit when the light irradiation is greater than 20 J.

TABLE 1

|  | Light Irradiation | Content of RM (wt %) | Percentage (%) | ppm |
|---|---|---|---|---|
| Comparative example | 0 J | 0.134 | 66.9 | 1338 |
|  | 10 J | 0.048 | 23.9 | 478 |
|  | 20 J | 0.016 | 8.2 | 163 |
|  | 30 J | not detected |  |  |
|  | 40 J | not detected |  |  |
|  | 50 J | not detected |  |  |
|  | 60 J | not detected |  |  |
|  | 70 J | not detected |  |  |
| Exemplary Embodiment 1 | 0 J | 0.117 | 58.6 | 1171 |
|  | 10 J | 0.007 | 3.7 | 73 |
|  | 20 J | Less than detection limit |  |  |
|  | 30 J | not detected |  |  |
|  | 40 J | not detected |  |  |
|  | 50 J | not detected |  |  |
|  | 60 J | not detected |  |  |
|  | 70 J | not detected |  |  |

TABLE 1-continued

| | Light Irradiation | Content of RM (wt %) | Percentage (%) | ppm |
|---|---|---|---|---|
| Exemplary Embodiment 2 | 0 J | 0.150 | 75.2 | 1504 |
| | 10 J | Less than detection limit | | |
| | 20 J | not detected | | |
| | 30 J | not detected | | |
| | 40 J | not detected | | |
| | 50 J | not detected | | |
| | 60 J | not detected | | |
| | 70 J | not detected | | |

The initiator according to an exemplary embodiment of the present invention may include a compound represented by Formula 3, Formula 4, Formula 5, Formula 6, Formula 7, Formula 8, Formula 9, Formula 10, Formula 11, and Formula 12 below.

Formula 3

Formula 4

Formula 5

Formula 6

Formula 7

Formula 8

Formula 9

Formula 10

Formula 11

Formula 12

Figure 4:
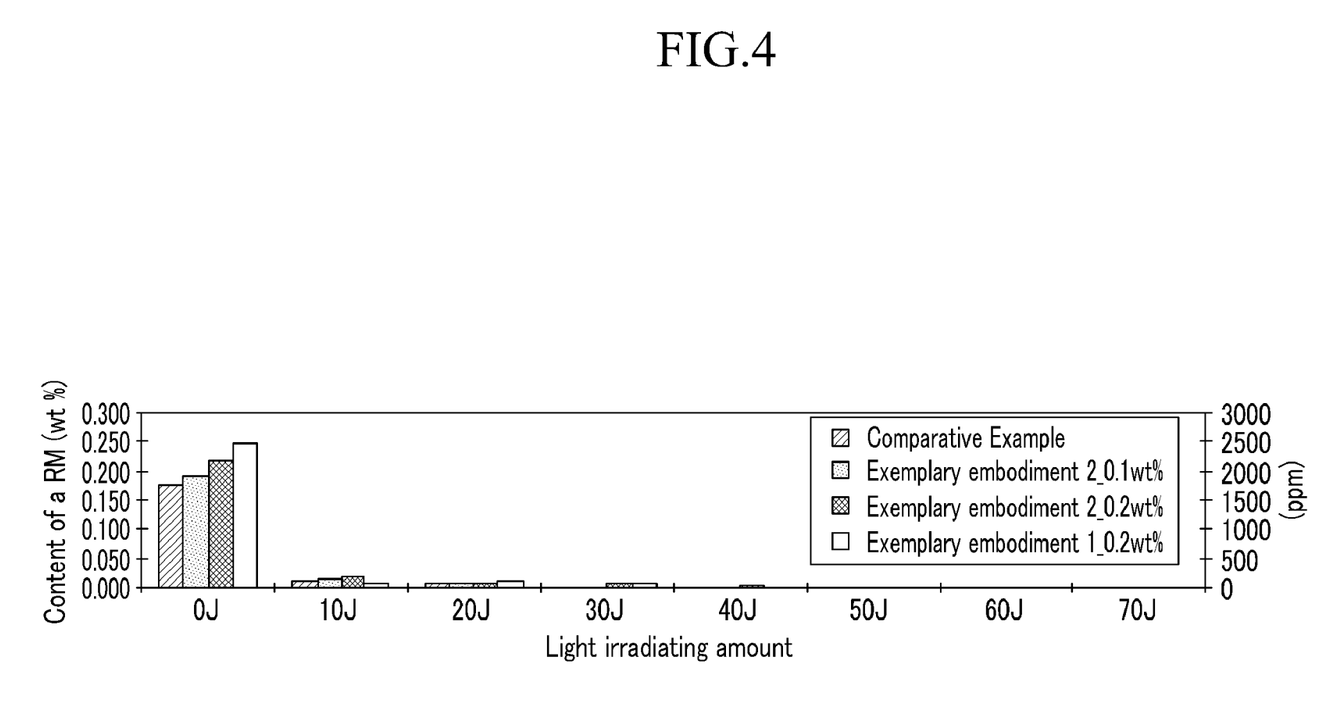
FIG. 4 is a graph showing the amount that a reactive mesogen is decreased corresponding to an amount of an initiator and light irradiation of a liquid crystal display according to an exemplary embodiment of the present invention.

FIG. 4 is a graph showing the amount that a reactive mesogen is decreased corresponding to an amount of an initiator and light irradiation of a liquid crystal display according to an exemplary embodiment of the present invention.

Table 2, shown below, lists the decrease of the reactive mesogen according to the content of the initiator and the light irradiating amount.

The Comparative Example corresponds to exclusion of the initiator, and Exemplary Embodiment 1 includes an initiator represented by Formula 1. Exemplary Embodiment 2 includes an initiator represented by Formula 2. Data are for the initiator content of Exemplary Embodiment 1 at 0.2 wt % and the initiator content of Exemplary Embodiment 2 at 0.1 wt % and 0.2 wt %.

Referring to FIG. 4 and Table 2, when the light irradiating amount is more than 50 J in the Comparative Example, the reactive mesogen is almost completely consumed for all exemplary embodiments. When the light irradiating amount is 40 J in Exemplary Embodiment 1 corresponding to 0.2 wt % initiator, the reactive mesogen is almost completely consumed. For Exemplary Embodiment 2, two concentrations of initiator are studied corresponding to initiator contents of 0.1 wt % and 0.2 wt %.

When the light irradiating amount is 40 J for Exemplary Embodiment 2 with 0.1 wt % initiator, the reactive mesogen is almost completely consumed. When the light irradiating amount is 30 J in Exemplary Embodiment 2 with 0.2 wt % initiator, the reactive mesogen is almost completely consumed.

In the case of 0.1 wt % initiator, the consumption rate of the reactive mesogen is rapid compared to when the initiator is excluded, and the consumption rate is even greater at 0.2 wt % of initiator.

TABLE 2

| | Light Irradiation | Content of RM (wt %) | Percentage (%) | ppm |
|---|---|---|---|---|
| Comparative example | 0 J | 0.217 | 108.5 | 2171 |
| | 10 J | 0.017 | 8.5 | 170 |
| | 20 J | 0.008 | 4.1 | 82 |
| | 30 J | 0.006 | 2.9 | 57 |
| | 40 J | 0.005 | 2.7 | 55 |
| | 50 J | Less than detection limit | | |
| | 60 J | not detected | | |
| | 70 J | not detected | | |
| Exemplary embodiment 2 (0.1 wt %) | 0 J | 0.249 | 124.5 | 2489 |
| | 10 J | 0.009 | 4.3 | 87 |
| | 20 J | 0.010 | 5.1 | 102 |
| | 30 J | 0.006 | 4.6 | 63 |
| | 40 J | Less than detection limit | | |
| | 50 J | Less than detection limit | | |
| | 60 J | not detected | | |
| | 70 J | not detected | | |
| Exemplary Embodiment 2 (0.2 wt %) | 0 J | 0.175 | 87.6 | 1752 |
| | 10 J | 0.012 | 6.0 | 121 |
| | 20 J | 0.175 | 2.9 | 58 |
| | 30 J | Less than detection limit | | |
| | 40 J | Less than detection limit | | |
| | 50 J | Less than detection limit | | |
| | 60 J | not detected | | |
| | 70 J | not detected | | |
| Exemplary Embodiment 1 (0.2 wt %) | 0 J | 0.193 | 96.7 | 1933 |
| | 10 J | 0.016 | 7.8 | 155 |
| | 20 J | 0.008 | 3.9 | 78 |
| | 30 J | Less than detection limit | | |
| | 40 J | Less than detection limit | | |
| | 50 J | Less than detection limit | | |
| | 60 J | Less than detection limit | | |
| | 70 J | not detected | | |

Figure 5:
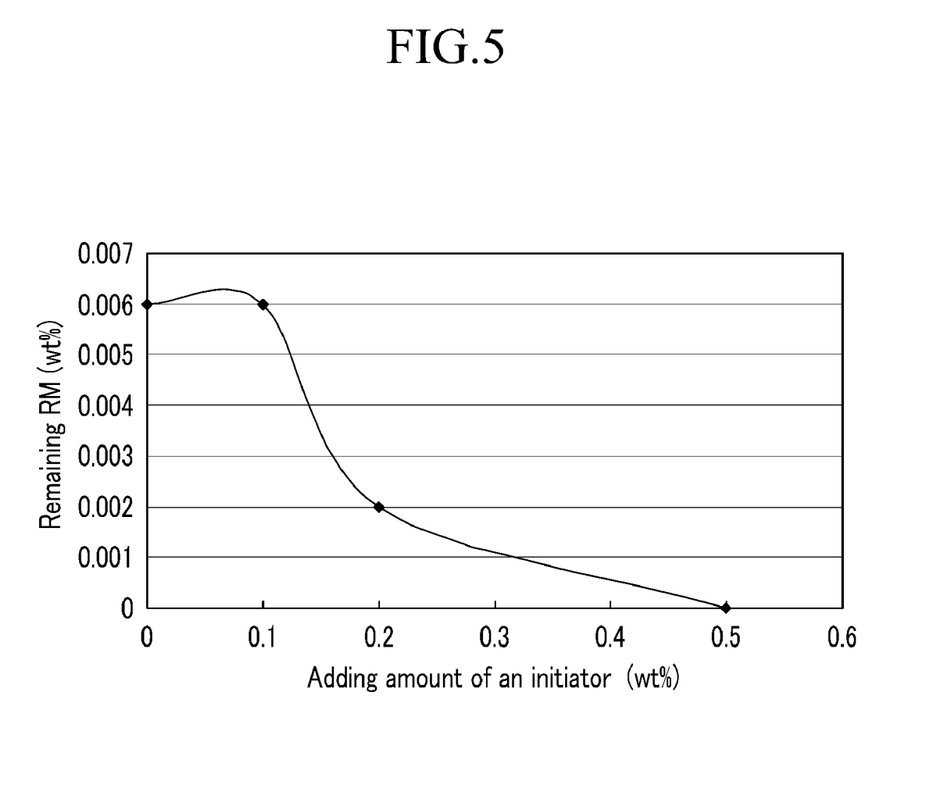
FIG. 5 is a graph showing the remaining amount of a reactive mesogen corresponding to an amount of initiator added in a liquid crystal display according to an exemplary embodiment of the present invention.

FIG. 5 is a graph showing the remaining amount of a reactive mesogen (RM) corresponding to an amount of initiator added in a liquid crystal display according to an exemplary embodiment of the present invention.

Referring to FIG. 5, results for the remaining amount of reactive mesogen are shown as a function of the amount of the initiator added in the alignment layer. When the amount of initiator is increased from 0.1 wt % to 0.2 wt %, the remaining amount of reactive mesogen noticeably decreases. When the initiator is increased to 0.5 wt %, the remaining reactive mesogen has a nearly undetectable signature, i.e., the remaining amount is nearly at the detection limit or within the background noise. Therefore, the initiator content according to an exemplary embodiment of the present invention preferably ranges from 0.2 wt % to 0.5 wt %.

Table 3 and Table 4 show experimental data for the elemental composition of the remaining components in the alignment layer determined by an electron probe micro-analyzer (EPMA) after light irradiation. The initiator in the experimental examples is the compound represented by Formula 2, and, as an analyte, phosphorus (P) is not detected in the alignment layer. The data shows the initiator content decreases after the initiator is used for acceleration of the polymerization of the reactive mesogen and is nearly undetectable in the alignment layer after the light irradiation. As a result, the probability of the initiator remaining in the alignment layer as an impurity is low.

TABLE 3

(Addition of 0.1 wt % initiator)

| wt (%) | Mol (%) | Element |
|---|---|---|
| 47.150 | 65.628 | C |
| 23.315 | 24.363 | O |
| 13.998 | 2.038 | In |
| 7.010 | 4.173 | Si |
| 3.041 | 1.884 | Al |
| 2.459 | 0.429 | Mo |
| 2.137 | 1.114 | S |
| 0.890 | 0.371 | Ca |

TABLE 4

(Addition of 0.2 wt % initiator)

| wt (%) | mol (%) | Element |
|---|---|---|
| 49.590 | 68.482 | C |
| 20.455 | 21.207 | O |
| 13.637 | 1.970 | In |
| 7.453 | 4.402 | Si |
| 3.266 | 2.007 | Al |
| 2.527 | 0.437 | Mo |
| 2.165 | 1.120 | S |
| 0.907 | 0.376 | Ca |

Figure 6:
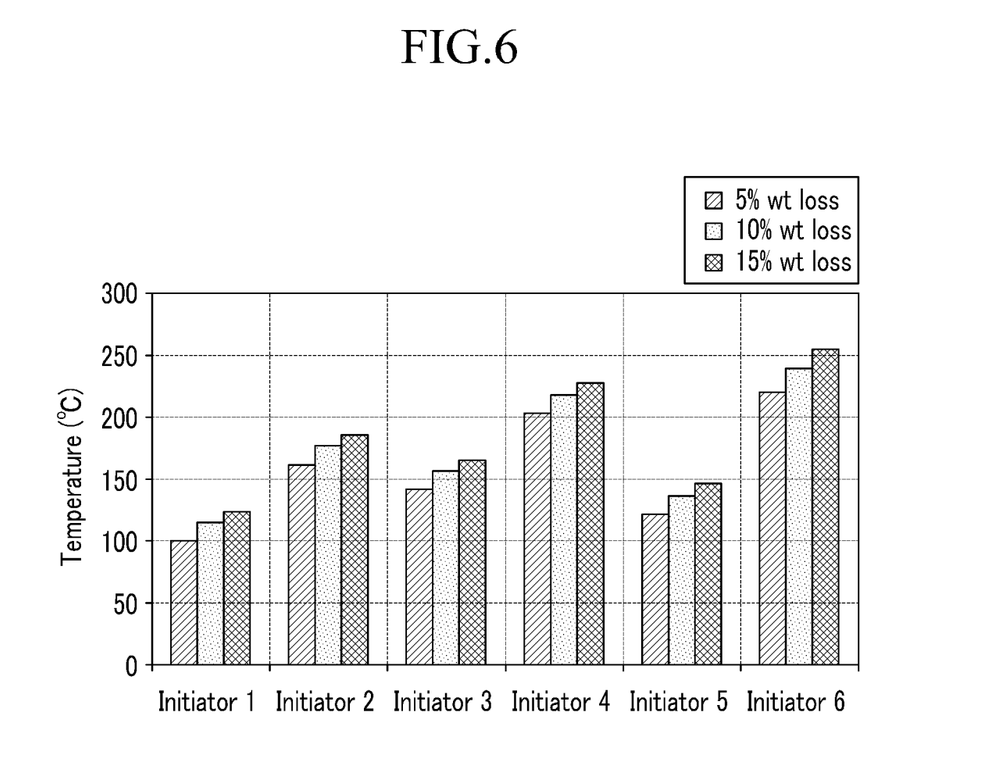
FIG. 6 is a graph showing thermal weight loss as a function of the initiator in a liquid crystal display according to an exemplary embodiment of the present invention

FIG. 6 is a graph showing thermal weight loss as a function of the initiator in a liquid crystal display according to an exemplary embodiment of the present invention.

Referring to FIG. 6, Initiator 1 is Darocur 1173 (CIBA Company); Initiator 2 is Irgacure 184; Initiator 3 is Irgacure 500; Initiator 4 is Irgacure 2959; Initiator 5 is Darocur MBF; and Initiator 6 is Irgacure 754.

The results of measuring the thermal weight losses for the initiators using a thermal weight analyzer indicate that Initiator 6 has the lowest thermal weight loss at various temperatures. Accordingly, when a high temperature process is required, Initiator 6 may be added to the alignment layer.

Next, a liquid crystal display and a manufacturing method of the liquid crystal display according to an exemplary embodiment of the present invention is described with reference to FIG. 1, FIG. 2, FIG. 7, FIG. 8, FIG. 9, and FIG. 10.

Figure 7:
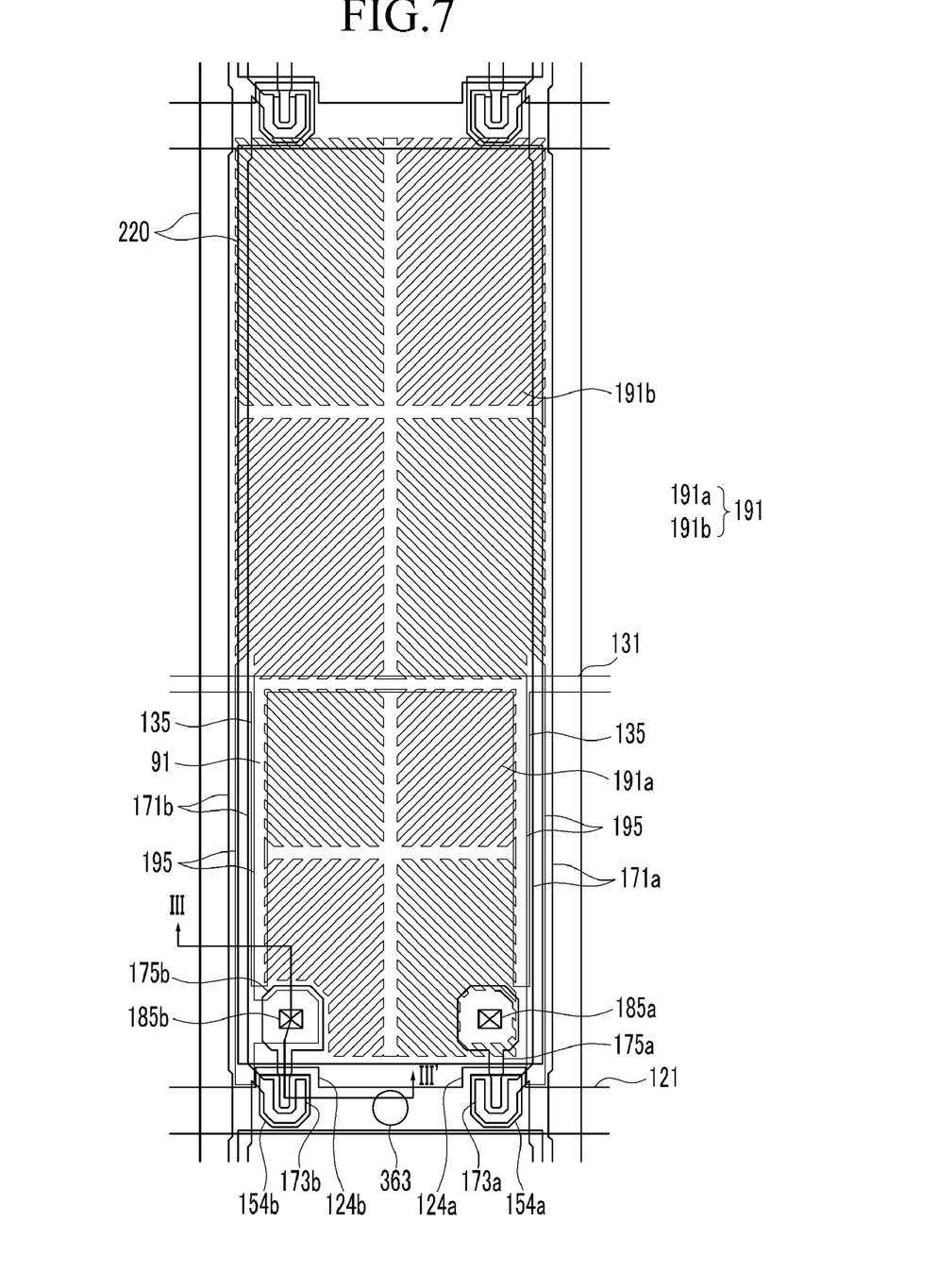
FIG. 7 is a layout view of a liquid crystal display according to an exemplary embodiment of the present invention.
Figure 8:
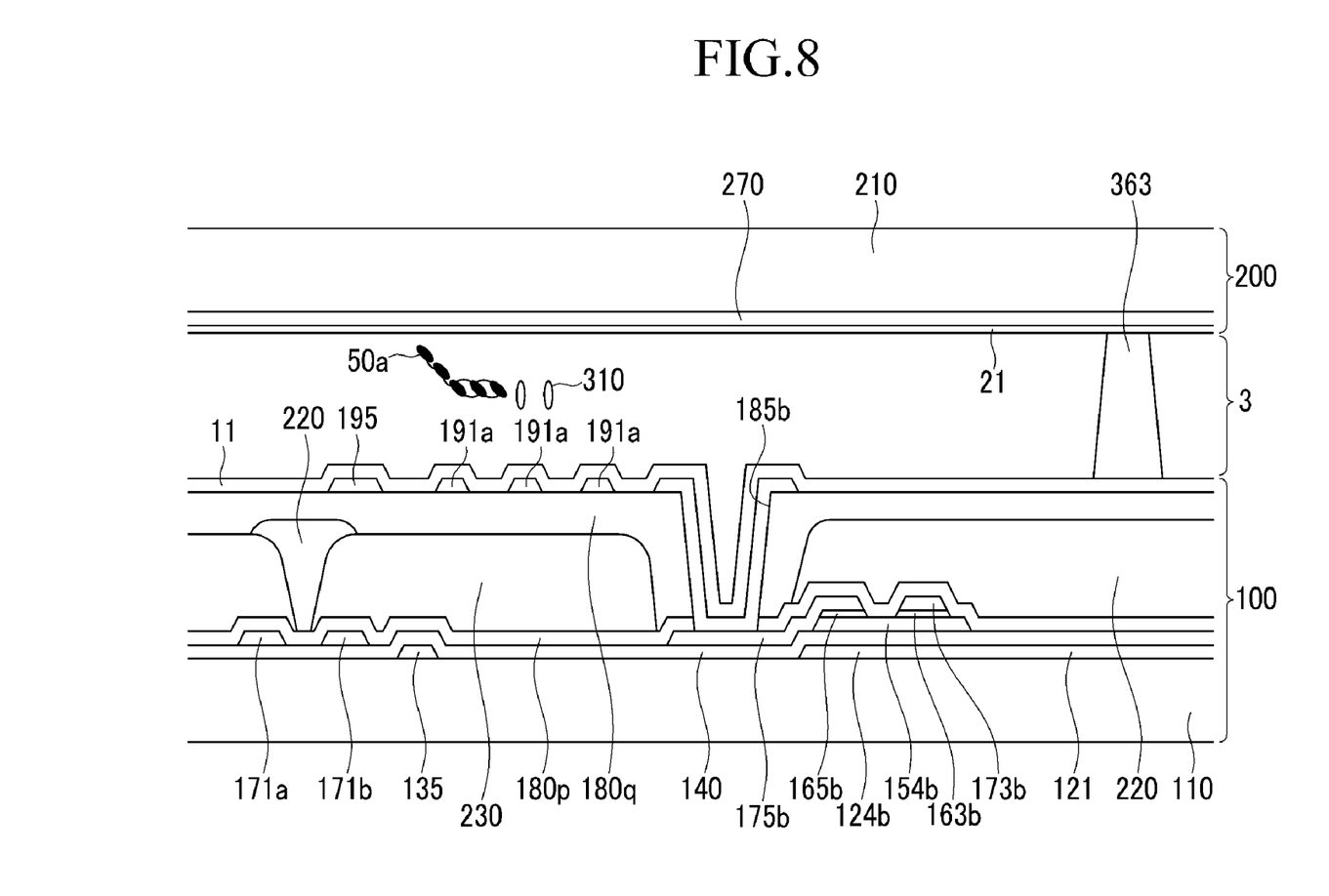
FIG. 8 is a cross-sectional view taken along line III-III' of FIG. 7.
Figure 9:
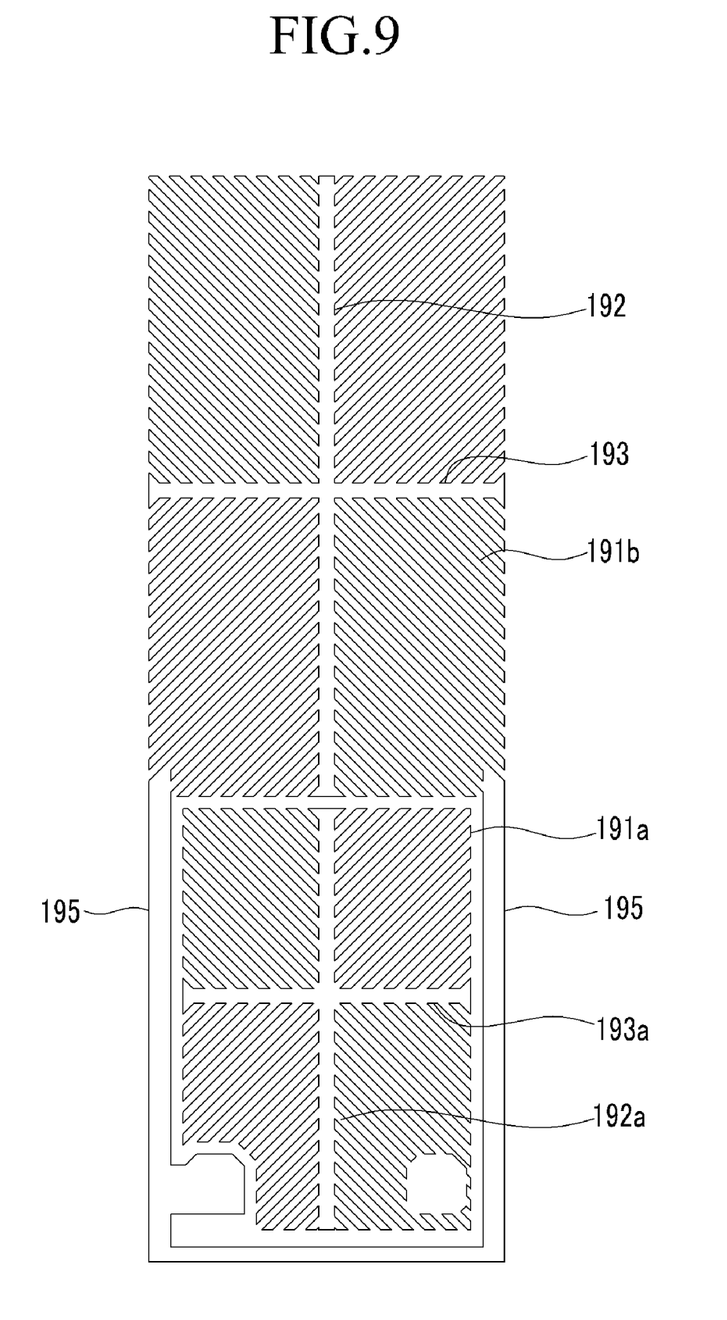
FIG. 9 is a plan view of a pixel electrode according to an exemplary embodiment of the present invention.
Figure 10:
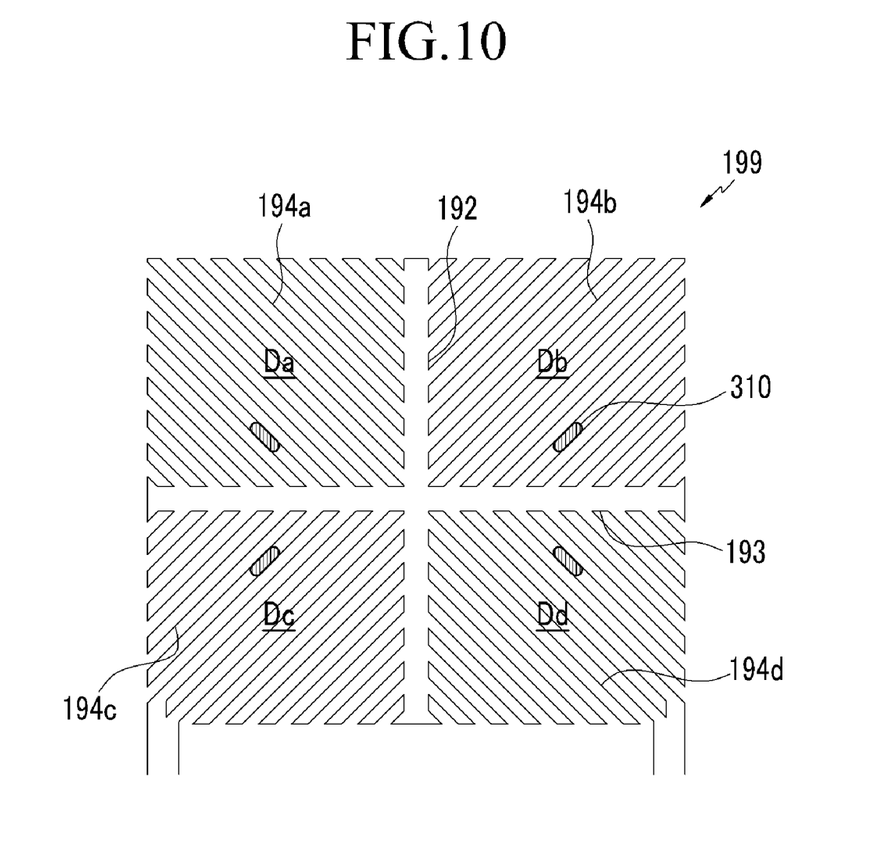
FIG. 10 is a plan view of an electrode of a liquid crystal display according to an exemplary embodiment of the present invention.

FIG. 7 is a layout view of a liquid crystal display according to an exemplary embodiment of the present invention, and FIG. 8 is a cross-sectional view taken along line III-III' of FIG. 7. FIG. 9 is a plan view of a pixel electrode according to an exemplary embodiment of the present invention, and FIG. 10 is a plan view of an electrode of a liquid crystal display according to an exemplary embodiment of the present invention.

Referring to FIG. 7 and FIG. 8, a thin film transistor array panel 100 and a common electrode panel 200 are shown.

A manufacturing method of the lower panel 100 is as follows.

A plurality of thin films are deposited and patterned on a substrate 110 sequentially to form a gate line 121 including gate electrodes 124a and 124b (reference number 124 includes reference numerals 124a and 124b), a gate insulating layer 140, semiconductors 154a and 154b, data lines 171a and 171b including source electrodes 173a and 173b, drain electrodes 175a and 175b, and a lower passivation layer 180p. A storage electrode line 131, 135 may be formed on the same layer as the gate line 121. The storage electrode lines 131, 135 includes a stem line 131 extending substantially parallel to the gate line 121 and a storage electrode 135 extending away from the stem line 131.

Ohmic contact layers 163b and 165b may be disposed between the semiconductor 154b and the source electrode 173b or between the semiconductor 154b and the drain electrode 175b, respectively. Next, a color filter 230 is formed on the lower passivation layer 180p, and a light blocking member 220 for preventing light leakage is formed on the color filter 230. An upper passivation layer 180q is formed on the light blocking member 220 and the color filter 230.

A conductive layer such as indium tin oxide (ITO) or indium zinc oxide (IZO) is deposited and patterned on the upper passivation layer 180q, as shown in FIG. 9 and FIG. 10; to form a pixel electrode 191 including a longitudinal portion 192, a transverse portion 193, and a plurality of minute branches 194a, 194b, 194c, and 194d extended from them. Next, an alignment material including the initiator is coated on the pixel electrode 191 to form the alignment layer 11.

The upper panel 200 is manufactured as follows.

A common electrode 270 is formed on the substrate 210. Then, an alignment material including the initiator is coated on the common electrode 270 to form the alignment layer 21.

Next, the lower panel 100 and the upper panel 200 that are manufactured through the above-described method are assembled, and a liquid crystal layer 3 is formed by injecting a mixture of liquid crystal molecules 310 and the alignment aid between the lower panel 100 and the upper panel 200.

Alternatively, the liquid crystal layer 3 may be formed by a method in which the mixture of the liquid crystal molecules 310 and the alignment aid is dripped on the lower panel 100 or the upper panel 200.

Next, referring to FIG. 1 and FIG. 2, the pixel electrode 191 and the common electrode 270 are applied with the voltages.

The liquid crystal 310 and the alignment aid 50 are inclined in the direction parallel to the length direction of the minute branches 194a, 194b, 194c, and 194d of the pixel electrode 191 by the application of the voltages.

The light 1 is irradiated when the pixel electrode 191 and the common electrode 270 are applied with the voltages. The light 1 has a wavelength, e.g., ultraviolet wavelengths, that may polymerize the alignment aid 50.

Referring to FIG. 8, after the light irradiation, the alignment aid 50 gathered in adjacent positions to the alignment layer 121 is light-polymerized thereby forming an alignment polymer 50a.

Here, the initiator according to an exemplary embodiment of the present invention is a mixture in the alignment layer 21, and the initiator accelerates the polymerization of the alignment aid 50 near the surface of the alignment layer 21.

The alignment polymer 50a is arranged according to the alignment of the liquid crystal, and the arrangement is maintained after the applied voltage is removed thereby controlling the pretilt of the liquid crystal 310.

Spacer 363 for maintaining an interval between the upper panel 200 and the lower panel 100 may be formed between the upper and lower panels 200 and 100.

As described above, according to an exemplary embodiment of the present invention, the alignment layer includes the initiator such that the hardening rate of the reactive mesogen may be improved and the processing time thereof may be reduced, and a small remaining mesogen amount may be obtained through a slight light irradiation amount such that damage to the organic layer may be minimized.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A liquid crystal display, comprising:
a first substrate;
a second substrate facing the first substrate;
a field generating electrode disposed on at least one of the first substrate and the second substrate;
an alignment layer disposed on the field generating electrode; and
a liquid crystal layer interposed between the first substrate and the second substrate and comprising a liquid crystal and an alignment polymer,
wherein the alignment layer initially comprises an alignment material comprising an initiator, and the alignment polymer initially comprises an alignment aid.

2. The liquid crystal display of claim 1, wherein the initiator comprises at least one member of compounds represented by Formula 1, Formula 2, Formula 3, and Formula 4 below and mixtures thereof:

Formula 1

Formula 2

Formula 3

Formula 4

3. The liquid crystal display of claim 2, wherein the initiator in the alignment material ranges from 0.2 wt % to 0.5 wt %.

4. The liquid crystal display of claim 3, wherein the alignment material comprises one of a polyamic acid, a polyimide, and a polysiloxane.

5. The liquid crystal display of claim 1, wherein the first substrate comprises a thin film transistor array panel, the second substrate comprises a common electrode panel, and at least one of a color filter and a black matrix is disposed on the thin film transistor array panel.

6. The liquid crystal display of claim 5, wherein the field generating electrode comprises a plurality of minute branches.

7. The liquid crystal display of claim 6, further comprising:
   a gate line disposed on the first substrate;
   a first data line disposed on the first substrate;
   a second data line disposed on the first substrate;
   a first thin film transistor connected to the gate line and the first data line; and
   a second thin film transistor connected to the gate line and the second data line,
   wherein the field generating electrode further comprises a first sub-pixel electrode connected to the first thin film transistor and a second sub-pixel electrode connected to the second thin film transistor.

8. A method for manufacturing a liquid crystal display, comprising:
   forming a field generating electrode on at least one of a first substrate and a second substrate facing the first substrate;
   forming an alignment layer comprising an initiator on the field generating electrode;
   disposing a liquid crystal layer comprising a liquid crystal and an alignment aid between the first substrate and the second substrate;
   applying a first voltage to the first substrate and a second voltage to the second substrate, the first voltage and the second voltage being different from each other; and
   irradiating light to the alignment layer and the liquid crystal layer to form an alignment polymer.

9. The method of claim 8, wherein the initiator comprises at least one member of compounds represented by Formula 1, Formula 2, Formula 3, and Formula 4 below and mixtures thereof:

Formula 1

Formula 2

Formula 3

Formula 4

10. The method of claim 9, wherein the initiator ranges from 0.2 wt % to 0.5 wt %.

11. The method of claim 10, wherein an alignment material in the alignment layer comprises one of a polyamic acid, a polyimide, and a polysiloxane.

12. The method of claim 8, wherein the light comprises ultraviolet wavelengths.

13. The method of claim 8, wherein the alignment polymer is formed by polymerizing the alignment aid, and the initiator does not remain in the alignment layer after the alignment polymer is formed.

14. The method of claim 8, wherein the first substrate comprises a thin film transistor array panel, the second substrate comprises a common electrode panel, and at least one of a color filter and a black matrix is formed on the thin film transistor array panel.

15. The method of claim 8, wherein the field generating electrode comprises a plurality of minute branches.

16. The method of claim 8, further comprising:
   forming a gate line on the first substrate;
   forming a first data line on the first substrate;
   forming a second data line on the first substrate;
   forming a first thin film transistor connected to the gate line and the first data line; and
   forming a second thin film transistor connected to the gate line and the second data line,
   wherein the field generating electrode further comprises a first sub-pixel electrode connected to the first thin film transistor and a second sub-pixel electrode connected to the second thin film transistor.

* * * * *